United States Patent
Zhou et al.

(10) Patent No.: US 9,995,577 B2
(45) Date of Patent: Jun. 12, 2018

(54) MEASURING SYSTEM AND OPERATING METHOD THEREOF

(71) Applicant: CHERVON INTELLECTUAL PROPERTY LIMITED, Road Town (VG)

(72) Inventors: Qiwei Zhou, Nanjing (CN); Guigong Ni, Nanjing (CN)

(73) Assignee: Chervon (HK) Limited, Wanchai (HK)

(*) Notice: Subject to any disclaimer, the term of this patent is extended or adjusted under 35 U.S.C. 154(b) by 0 days. days.

(21) Appl. No.: 15/461,769

(22) Filed: Mar. 17, 2017

(65) Prior Publication Data
US 2017/0191827 A1    Jul. 6, 2017

Related U.S. Application Data

(63) Continuation of application No. 14/341,252, filed on Jul. 25, 2014, now Pat. No. 9,714,830.

(30) Foreign Application Priority Data

| Jul. 26, 2013 | (CN) | 2013 1 0318304 |
| Jul. 26, 2013 | (CN) | 2013 1 0319373 |
| Nov. 19, 2013 | (CN) | 2013 1 0584982 |

(51) Int. Cl.
| *G01C 3/08* | (2006.01) |
| *G01S 17/08* | (2006.01) |
| *G01S 7/481* | (2006.01) |
| *H04M 1/21* | (2006.01) |

(52) U.S. Cl.
CPC ............ *G01C 3/08* (2013.01); *G01S 7/4811* (2013.01); *G01S 17/08* (2013.01); *H04M 1/21* (2013.01)

(58) Field of Classification Search
CPC ......... G01C 3/08; G01S 17/08; G01S 7/4818; H04M 1/21
USPC ............................................. 356/4.01
See application file for complete search history.

(56) References Cited

U.S. PATENT DOCUMENTS

| 7,564,537 B2 * | 7/2009 | Stierle .............. G01C 3/08 356/4.01 |
| 9,377,303 B2 | 6/2016 | Giger et al. |
| 9,727,834 B2 * | 8/2017 | Reyes .............. G06Q 10/0635 |
| 2003/0137449 A1 | 7/2003 | Vashisth |
| 2006/0023199 A1 | 2/2006 | Stierle et al. |
| 2007/0097351 A1 * | 5/2007 | York .................. F41G 3/02 356/5.02 |
| 2008/0192256 A1 * | 8/2008 | Wolf ................. G01S 7/4813 356/445 |
| 2014/0190025 A1 | 7/2014 | Giger |
| 2014/0328521 A1 | 11/2014 | Colangelo |

* cited by examiner

*Primary Examiner* — Mark Hellner
(74) *Attorney, Agent, or Firm* — Greenberg Traurig, LLP

(57) ABSTRACT

A measuring system includes a smart terminal and a measuring device. The smart terminal includes a first power source module, a first processor, a first wireless communication unit and a memory. The measuring device includes a measuring module, a second power source module and a second wireless communication unit. The measuring system may include one or more applications to provide a rich set of functionalities.

5 Claims, 19 Drawing Sheets

MEASURING SYSTEM AND OPERATING METHOD THEREOF

CROSS REFERENCE TO RELATED APPLICATION

This application is a continuation of U.S. patent application Ser. No. 14/341,252, filed Jul. 25, 2014, entitled "Measuring System and Operating Method Thereof," which claims the benefit of CN 201310318304.8, filed on Jul. 26, 2013, CN 201310319373.0, filed on Jul. 26, 2013, and CN 201310584982.9, filed on Nov. 19, 2013, the disclosures of which are incorporated herein by reference in their entirety.

FIELD OF THE DISCLOSURE

The following generally relates to measuring tools and, more particularly, to a measuring system and an operating method thereof.

BACKGROUND

A laser range finder is an instrument that uses a laser to perform accurate measurement of a distance to a target. Upon operation, the laser range finder emits a very thin laser beam to the target, and a photoelectric element receives the laser beam reflected by the target, and then a timer measures a time period from emission to reception of the laser beam and calculates a distance from the device to the target. Known laser range finders have a relatively large size and are only used for distance measurement, exhibit simple functions and a complicated operation interface, and cannot meet a range of user's needs.

SUMMARY

The following describes a measuring system which seeks to overcome the limitations found in known laser range finders.

More particularly, the following describes a measuring system that includes a smart terminal and a measuring device. The smart terminal includes a first power source module, a first processor, a first wireless communication unit and a memory. The first power source module supplies power to the first processor, the first wireless communication unit and the memory, and the first wireless communication unit and the memory are connected to the first processor, and the memory further includes a measurement application. The measuring device includes a measuring module, a second power source module and a second wireless communication unit. The second power source module supplies power to the measuring module and the second wireless communication unit, and the measuring module includes a second processor which connects the second wireless communication unit to the second power source module. A wireless connection is capable of being formed between the second wireless communication unit and the first communication module, and the measurement application is capable of controlling the measuring device via the wireless connection.

The following also describes an operating method for such a measuring system. The operation method includes the following steps:

a) activating the measurement application in the smart terminal;

b) establishing a connection between the first wireless communication unit and the second wireless communication unit;

c) determining whether the connection is established and, if yes, powering on the measuring device or, if no, repeating the above step b);

d) after powering on the measuring device, using the second processor to determine whether the second wireless communication unit receives a control signal and sending the control signal to the second processor; and e) causing the second processor to control the measuring module to execute an action according to the above control signal.

Because the range finding system first connects the smart terminal to the range finding device with the smart terminal then sensing a control command to the range finding device to control the range finding device to execute a corresponding action, the range finding device does not need to be provided with keys and a display device. Furthermore, because the range finding device sends the measurement result to the smart terminal for subsequent processing an improvement will be realized with respect to the applicability of the measurement result.

As further described, a blueprint verifying application may be used in connection with the measurement whereupon measurement data may be conveniently introduced into an engineering blueprint without requiring manual intervention by the user so that the measurement result and size data can be compared conveniently, and it may be accurately determined that whether original data in the engineering blueprint is correct, and great convenience is brought to the user's data-verifying work.

DETAILED DESCRIPTION

Figure 1:
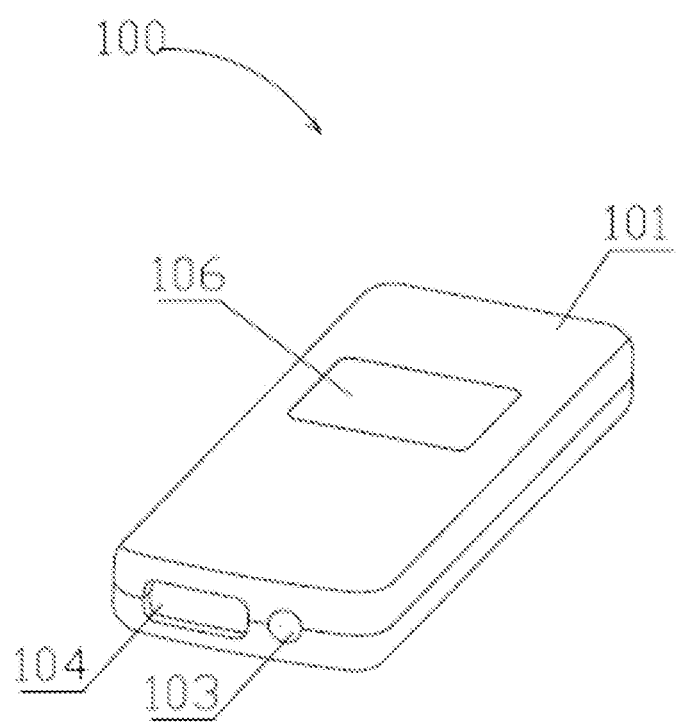
FIG. 1 is a schematic view of an exemplary laser range finder constructed according to the description which follows.
Figure 2:
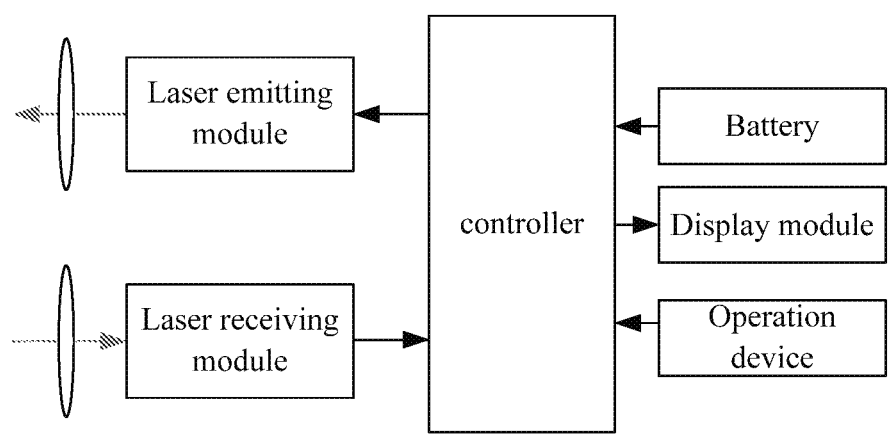
FIG. 2 is an exemplary circuit diagram of the laser range finder of FIG. 1.
Figure 3:
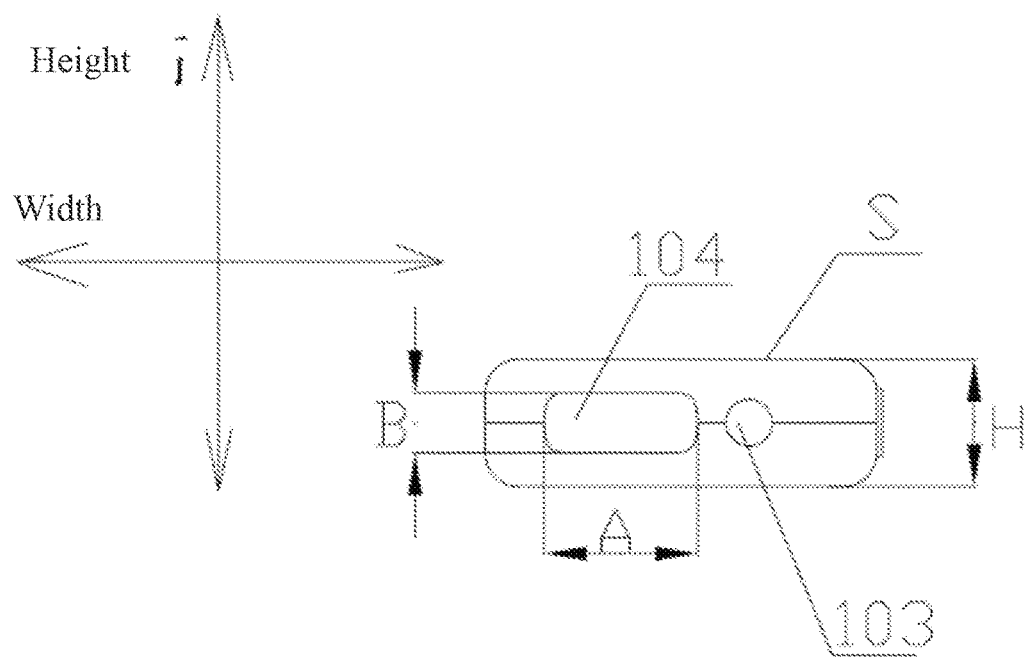
FIG. 3 is a schematic view of an end face S of the laser range finder of FIG. 1.

The subject system and method will now be described in detail with reference to the drawings.

Referring to FIG. 1 through FIG. 5, a laser range finder 100 includes a housing 101, a laser module 102, an emitting lens 103, a receiving lens 104, an optical path bracket 105, a display module 106, a circuit board 107 and a battery 108. A circuit portion of the laser range finder includes a power source module, a processing unit, a laser emitting module, a laser receiving module, a display unit and an operation device. The power source module includes a battery 108 and a corresponding circuit, and the display unit is disposed on the circuit board 107.

Figure 4:
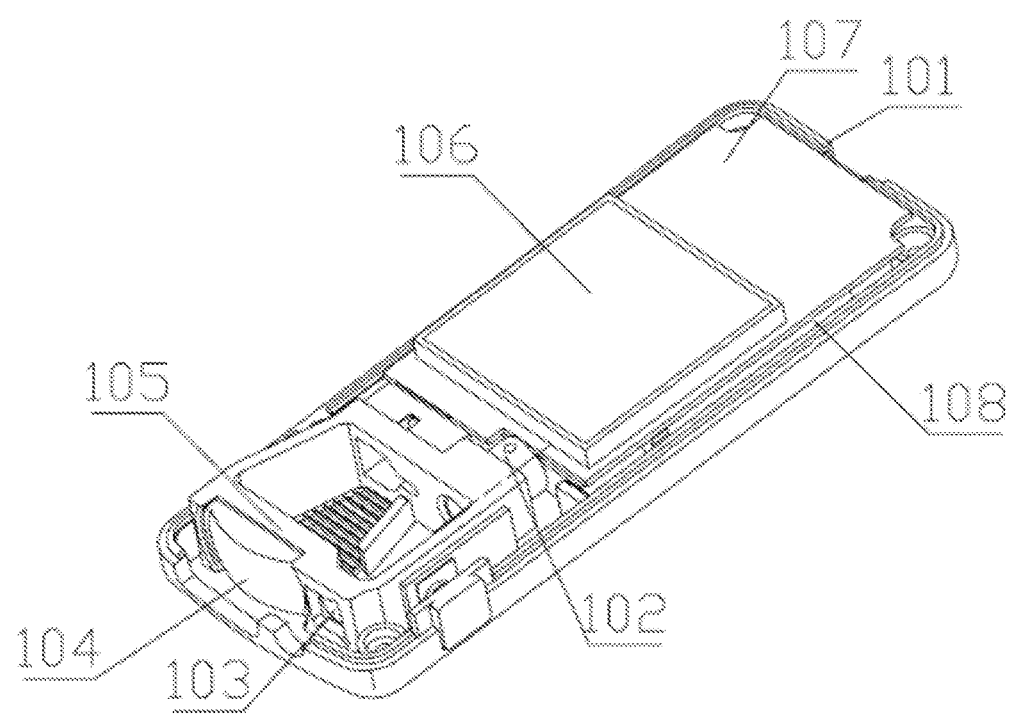
FIG. 4 is a perspective schematic view of an internal structure of the laser ranger finder of FIG. 1.

The optical path bracket 105 is used to carry the laser module 102, the emitting lens 103 and the receiving lens 104. The receiving lens 104 is disposed at an end face S of the housing 101. For reference, a long side of the end face S defines a width direction and a short side of the end face S defines a height direction. The receiving lens 104 is in a flat shape. A long axis A of the receiving lens is arranged in the width direction, and a short axis B of the receiving lens is arranged in the height direction. Furthermore, as shown in FIG. 4, the display module 106 is arranged in a height range of the optical path bracket 105, that is, an upper surface F1 of the display module 106 is not higher than an upper surface F2 of the optical path bracket 105, and a lower surface of the display module 106 is not lower than a lower surface of the optical path bracket 105.

Furthermore, a ratio of a size of the long axis A to the short axis B of the receiving lens 104 is 1.1:1~5:1, preferably 2:1 in the present embodiment; and a height H of the laser range finder is 6~20 mm, preferably 16 mm in the present embodiment.

In the illustrated device the receiving lens 104 is rectangular. However, it is to be understood that the receiving lens may be elliptical, diamond-shaped or trapezoidal so long as an effective light-receiving area of the receiving lens 104 can meet the range finding requirements.

Furthermore, in the described device the battery 108 is a lithium battery with a thickness of generally 2 mm~8 mm, preferably 3 mm, which can effectively reduce the thickness of the laser range finder. The battery 108 in other embodiments may be a dry battery with smaller dimensions.

Due to use of the flat receiving lens and the positional arrangement and design between the display module and the optical path bracket in the interior of the housing of the laser range finder, the laser range finder is thinner than currently known laser range finders so that the user can easily carry and hold it and great convenience is provided to the user's daily use.

To enable the laser range finder to have richer functions, a laser ranger finder 500 may be further adapted to be detachably connected to a handheld terminal 600 having a camera. Referring to FIGS. 6-9, the laser range finder 500 that is illustrated is similar to the laser range finder 100 described above. Differently, the laser range finder 500 further includes a reflection mirror 501 which is disposed in the housing 502. The housing has a ray incident opening 503 and a ray exit opening 504. The ray incident opening 503 and the ray exit opening 504 are respectively located on the incident ray side and the exit ray side of the reflection mirror 501, and the ray incident opening 503 and the receiving lens 505 of the laser range finder are disposed on the same end face of the laser range finder, and the ray exit opening 504 is adapted to a position of the camera 601.

As illustrated, an angle formed between the reflection mirror 501 and an axis L1 where the ray incident opening 503 lies is preferably 45 degrees.

Furthermore, both the ray incident opening 503 and the ray exit opening 504 of the reflection mirror are preferably provided with a dustproof element 506, 507.

Figure 8:
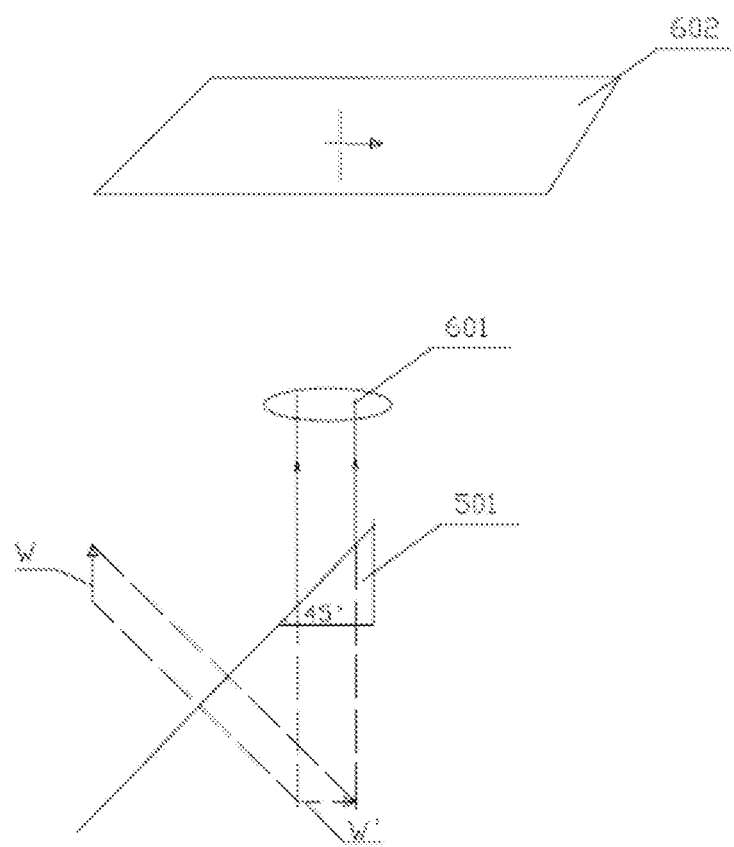
FIG. 8 is a schematic view of an optical path when the laser ranger finder of FIG. 6 is used to measure a ranging point in the distance.

The housing 502 may also be provided with a clamping element 508 for clamping the laser range finder 500 together with the handheld terminal 600 to better facilitate the user to observe images of the ranging point through a display screen of the handheld terminal. The clamping element 508 may be formed integrally with the hosing 502, or may be an individually formed element which is connected to the housing 502 by adhesion. In specific application, first the ray exit opening 504 on the laser range finder 500 is aligned with the camera 601, and the positions of the laser range finder 500 and the handheld terminal 600 may be relatively fixed through the clamping element 508. The application of the camera on the handheld terminal 600 is run, and due to the action of the reflection mirror 501, a ranging point W forms a virtual image W' through the reflection mirror 501, and the camera 601 will display the virtual image W' on the display screen of the handheld terminal 600. As shown in FIG. 8, at this time, the virtual image W' shot by the camera 601 does not totally accord with the ranging point W, but is rotated by a certain angle. There are many modes for displaying an image completely consistent with the ranging point W on the display screen, for example, by setting software in the handset or providing a set of lenses at the ray exit opening 504 of the reflection mirror 501. These modes all can implement rotation of images.

Figure 9:
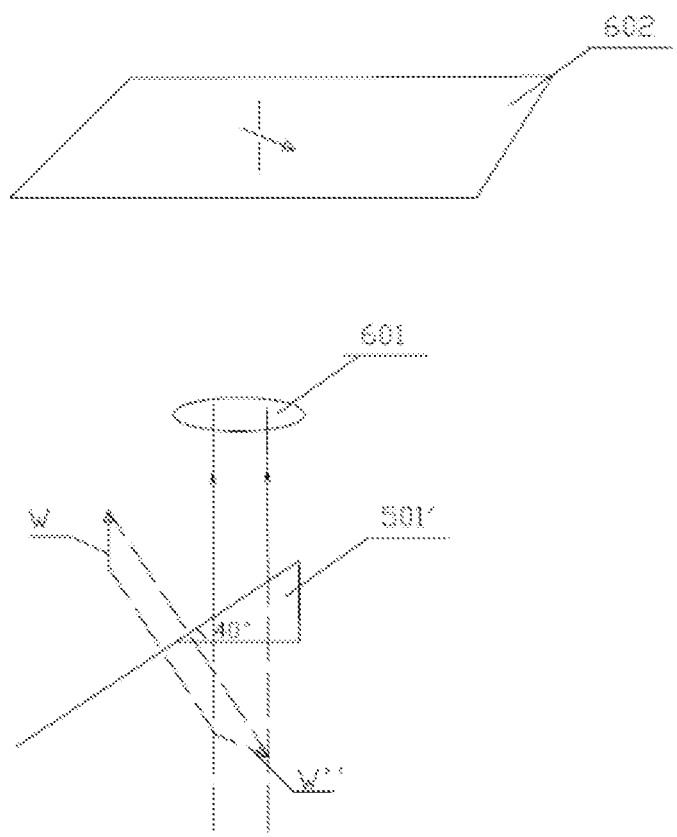
FIG. 9 is a schematic view of an optical path upon measuring the ranging point in the distance at an angle of 40 degrees.

As noted, an angle formed between the reflection mirror 501 and an axis L1 where the ray incident opening 503 lies is preferably 45 degrees. It will be understood that, in other embodiments, the angle may be in the range of 40 degrees to 60 degrees so long as the following two conditions are simultaneously satisfied: the reflection mirror 501 receives the image of the ranging point and the image formed by the ranging point in the reflection mirror can enter a shooting area of the camera 600. A change of the angle directly affects a rotation angle between the image viewed from the display screen and a real object of the ranging point W, for example, when the angle is 45 degrees, the image displayed on the display screen is rotated by 90 degrees in the clockwise direction; and when the angle is 40 degrees, the virtual image W'' displayed on the display screen is rotated by 100 degrees in the clockwise direction relative to the real object of the ranging point W. As shown in FIG. 9, correspondingly, when the angle is 50 degrees, the virtual image W''' displayed on the display screen is rotated by 80 degrees in the clockwise direction relative to the real object of the ranging point W.

To conclude, a reflection mirror may be provided in the interior of the laser range finder, and with the cooperation of the reflection mirror with the camera of the handheld terminal, the image at the location of a laser point in the distance may be clearly displayed on the handset for easy observation of the user, thereby replacing a telescopic system in the current laser range finders and greatly reducing the cost of the laser range finder.

Figure 10:
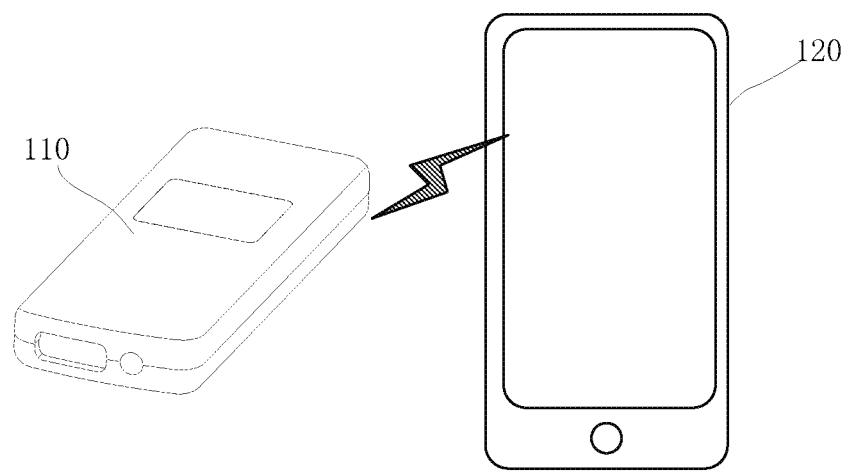
FIG. 10 is a schematic view showing an exemplary connection of a range finding system according to the description which follows.
Figure 11:
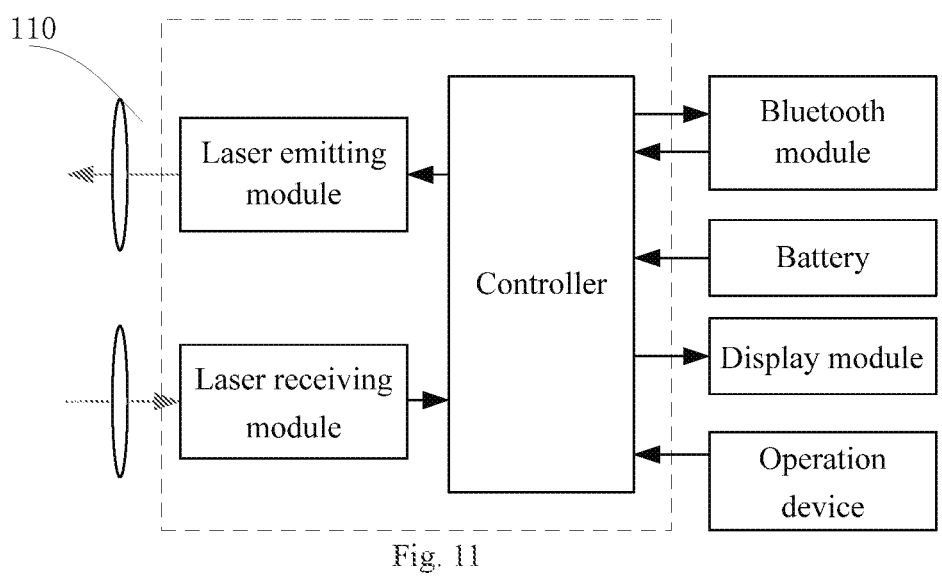
FIG. 11 is a circuit diagram of the laser range finding device of FIG. 10.
Figure 12:
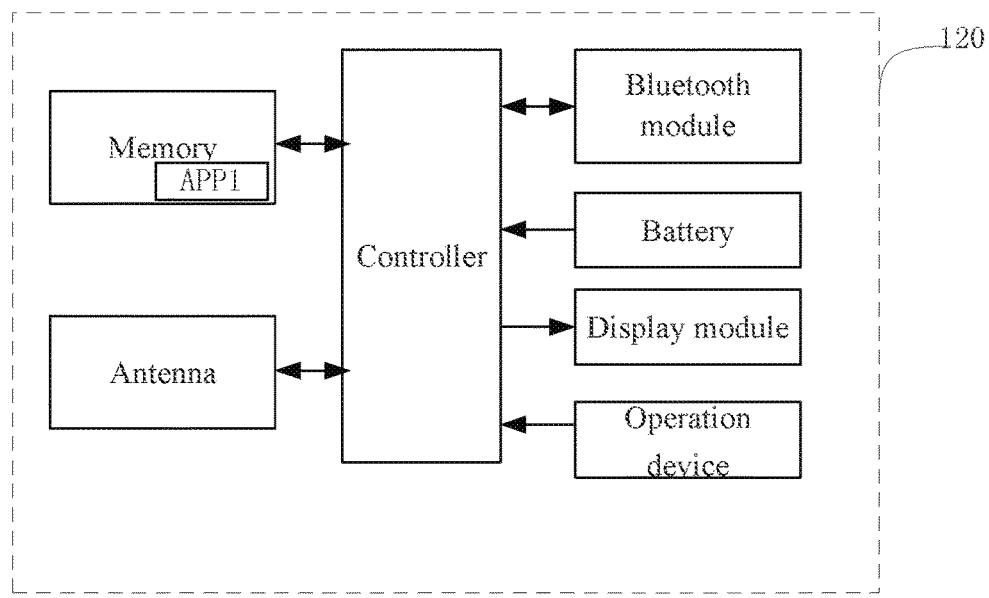
FIG. 12 is a circuit diagram of the smart terminal of FIG. 10.

As shown in FIGS. 10-12, a range finding system may include a measuring device 110 and a handset 120. In the illustrations, the measuring device 110 is a range finding device, and the range finding device 110 is similar to the range finding device described above with respect to FIGS. 1-5 in respect of structure and circuitry. Differently, the range finding device 110 further includes a Bluetooth module and is illustrated as further having a display device and an operation device. In other embodiments, the range finding device 110 does not need to be provided with the display device and the operation device.

The handset 120 includes a battery, a controller, a memory, an antenna, a Bluetooth module, a display module and an operation device. The basic operation principles of the handset need not be detailed herein any more. In the illustrated device, the memory of the handset 120 further includes a range finding application (APP1). The user runs the range finding application, and the Bluetooth module of the handset is wirelessly connected to the Bluetooth module of the range finding device so that actions such as start-up or measurement of the range finding device may be controlled on the handset.

Figure 13:
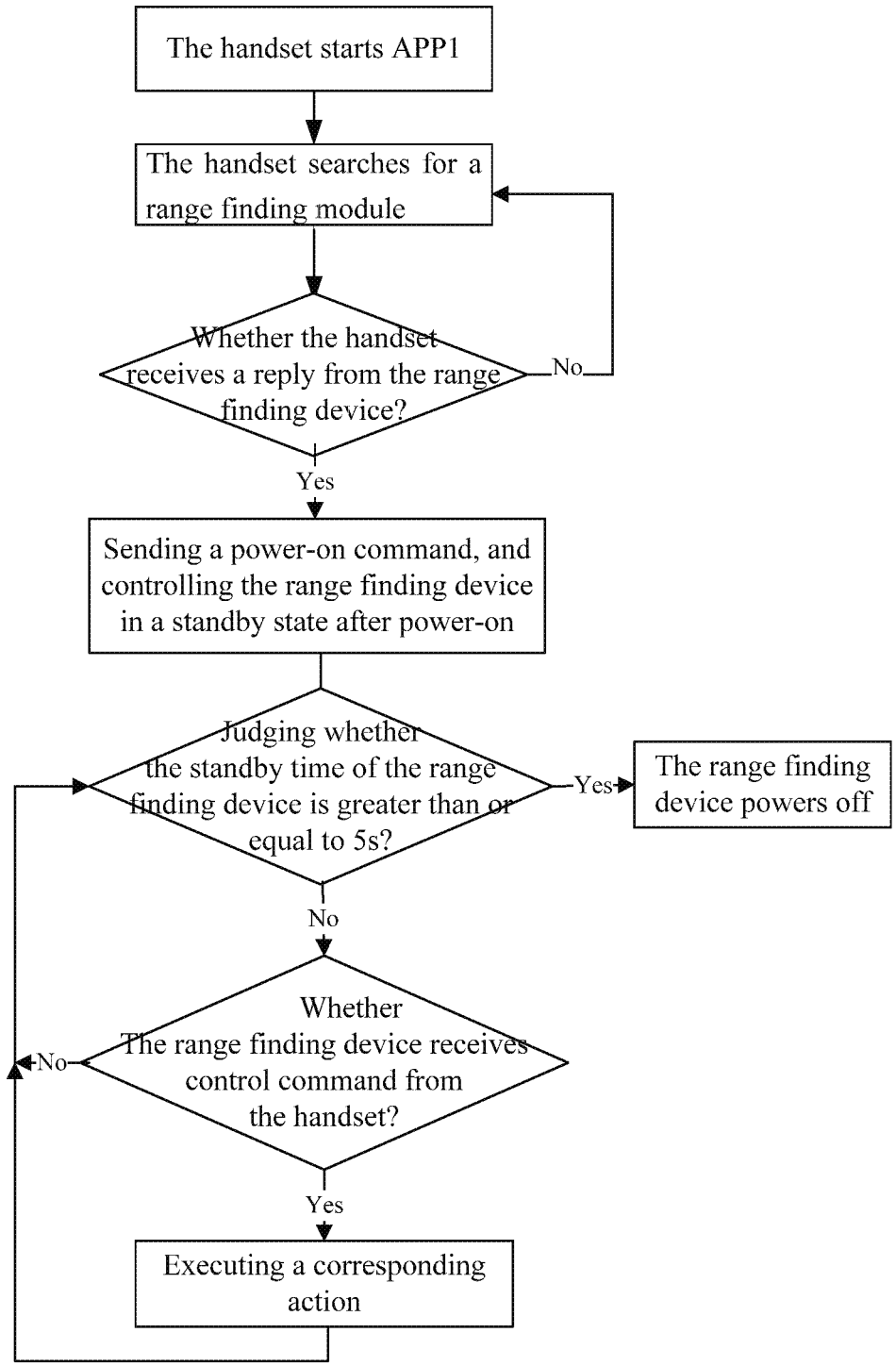
FIG. 13 is a flow chart of an exemplary operating method of the range finding system.
Figure 14:
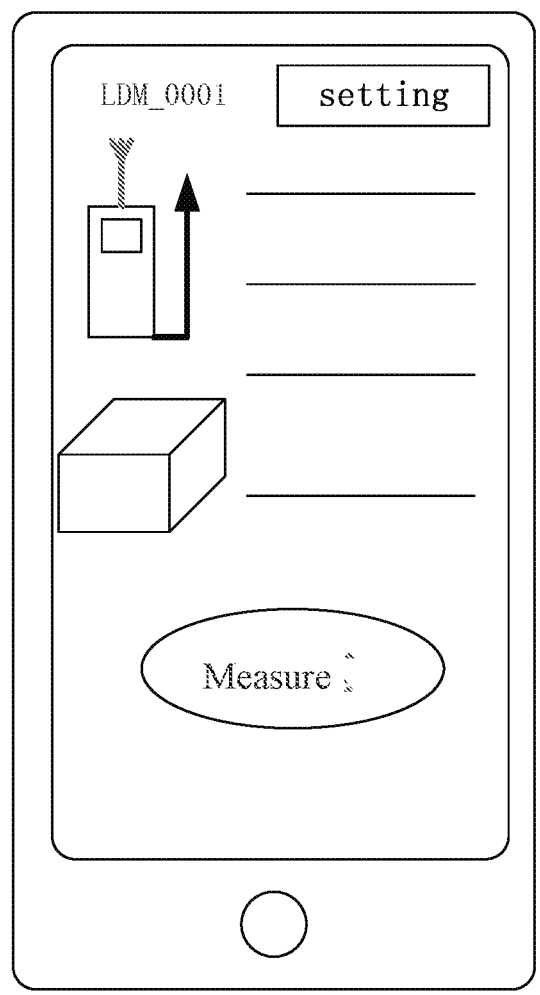
FIG. 14 is a schematic view of an exemplary operation interface of a range finding application in the range finding device.

An operating method of the range finding system in the present embodiment specifically includes the following steps, as shown in FIG. 13:

a) running the range finding application of the handset, and an operation interface of the range finding application is shown in FIG. 14;

b) causing the Bluetooth module of the handset to begin to search for a Bluetooth signal of the range finding device;

c) causing the handset to determine whether a reply signal of the range finding device has been received with step b) being repeated if the reply signal has not been received;

d) when the handset has received a reply signal of the range finding device, i.e., when it is determined that the connection between the handset and the range finding device is established, causing a powering-on of the range finding device being controlled via the range finding application, and placing the range finding device in a standby state;

e) determining by the range finding device whether a standby time is greater than or equal to 5 s, and, if so, causing the range finding device to be powered off;

f) when the standby time of the range finding device is less than 5 s, the range finding device determines whether a control command of the handset is received, and the range finding device continuing to remain in the standby state if the control command is not received, or the range finding device executes corresponding actions if the control command is received, the actions including measuring, switching of measuring benchmarks, and switching of measuring units.

Certainly, after the execution of the action is finished, an execution result of the action may be displayed via the display module of the range finding device itself, or the execution result may be sent to the display device of the handset via the Bluetooth module to display and perform subsequent processing.

While the Bluetooth module of the handset is described as being used to search for the Bluetooth signal of the range finding device, it is to be understood that it is also feasible that the Bluetooth module of the range finding device is used to search for the Bluetooth signal of the handset.

While the wireless identification and connection is described as being implemented between the handset and the range finding device via the Bluetooth module, it is to be understood that the wireless identification and connection may also be implemented between the handset and the range finding device via NFC. NFC differs from Bluetooth only in that NFC may implement automatic matching and automatic connection, whereas Bluetooth needs to be matched manually.

While the illustrated measuring device is described as being a range finding device, it is to be understood that the measuring device may be a level measuring device, an angle measuring device or other measuring tools, or the like.

To conclude, the measuring system first connects the smart terminal to the measuring device, and then the smart terminal sends a control command to the measuring device to control the measuring device to execute corresponding actions. As such, the measuring device may not be provided with keys and a display device. Furthermore, the measuring device sends the measurement result to the smart terminal for subsequent processing, which improves the applicability of the measurement result.

An engineering blueprint verification system may also be included with a measuring device 210 and a smart terminal 220. In such a system, the measuring device 210 is a laser range finder, and the measuring device 210 is similar to that described above with respect to FIGS. 10-12.

Figure 16:
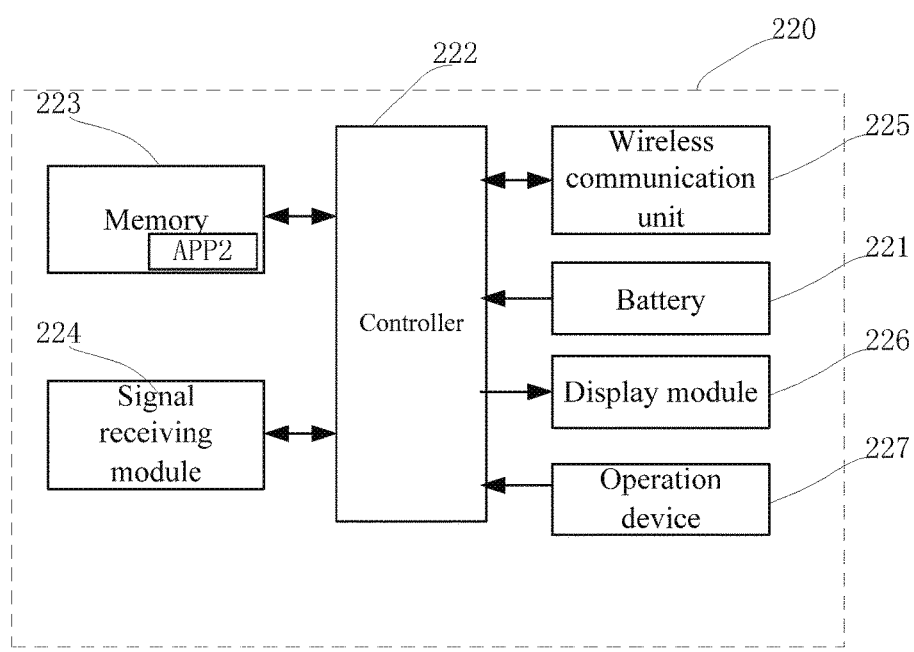
FIG. 16 is a block diagram illustrating exemplary components of a measuring device of FIG. 15.

The smart terminal 220 is a preferably in the form of a handset, which includes a battery 221, a controller 222, a memory 223, a signal receiving module 224, a wireless communication unit 225, a display module 226 and an operation device 227 as shown in FIG. 16. The battery 221 powers the controller 222. The wireless communication unit 225, the display module 226, the operation device 227, the memory 123 and the signal receiving module 224 are connected to the controller 222.

In the illustrated system, the communication units of the measuring device 210 and the smart terminal 220 are both wireless communication units. In other embodiments, the communication units of the measuring device 210 and the smart terminal 220 may also be wired communication units. For example, the connection may be established between the measuring device 210 and the smart terminal 220 via a USB data line. Furthermore, in the illustrated system, the wireless communication unit 225 of the handset and the wireless communication unit 216 of the laser range finder are both Bluetooth communication units. It may be appreciated that wireless identification and connection may be implemented between the handset and the range finding device via an NFC communication unit or an infrared transmission unit. The NFC communication unit differs from the Bluetooth communication unit only in that NFC communication unit may implement automatic matching and automatic connection, whereas Bluetooth needs to be matched manually.

Additionally, in the illustrated system, the memory 223 in the handset 220 further includes an engineering blueprint and a blueprint verifying application (APP2). The user may use the blueprint verification application to enable the wireless communication unit (Bluetooth communication unit)

225 of the handset and the wireless communication unit (Bluetooth communication unit) of the laser range finder to be matched and connected with each other.

Figure 5:
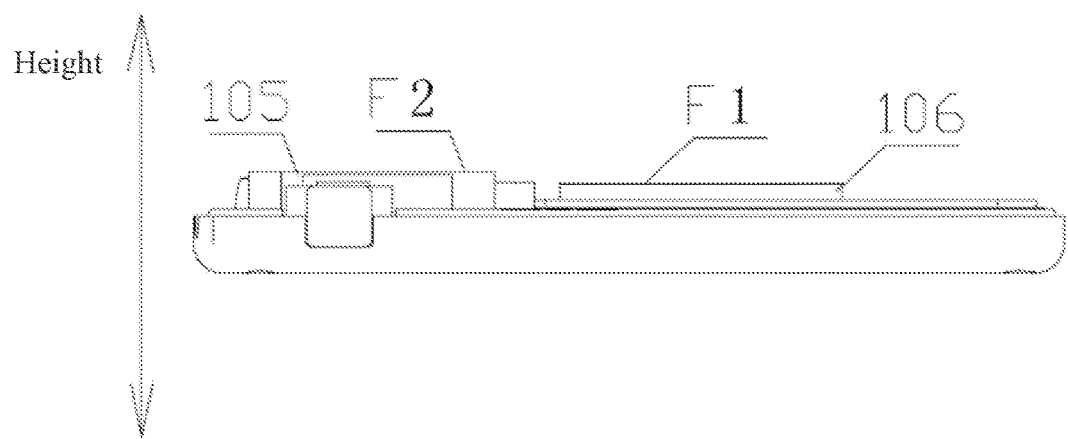
FIG. 5 is a planar schematic view of the internal structure of the laser ranger finder of FIG. 1.
Figure 6:
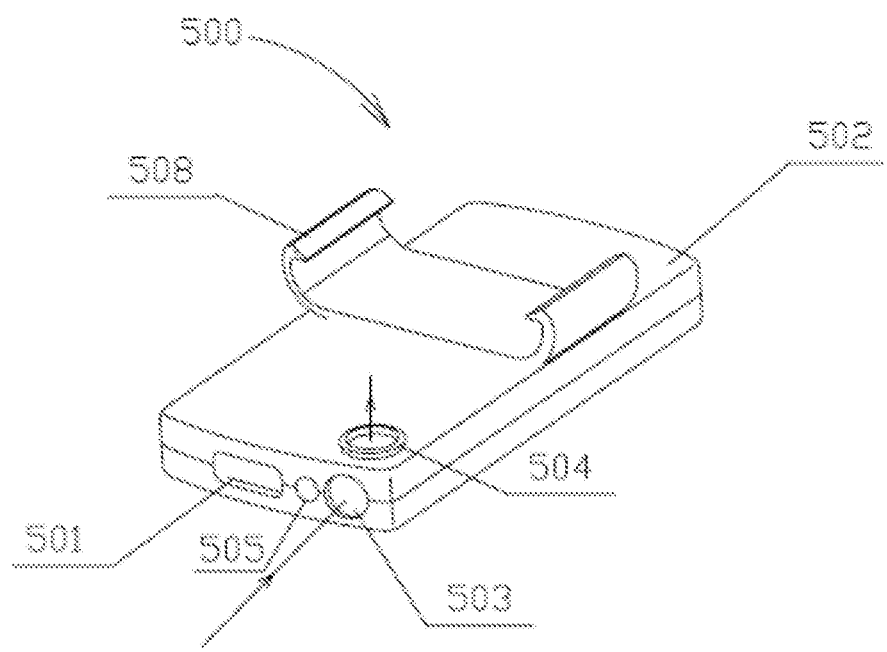
FIG. 6 is a schematic view of an exemplary laser range finder also constructed according to the description which follows.
Figure 7:
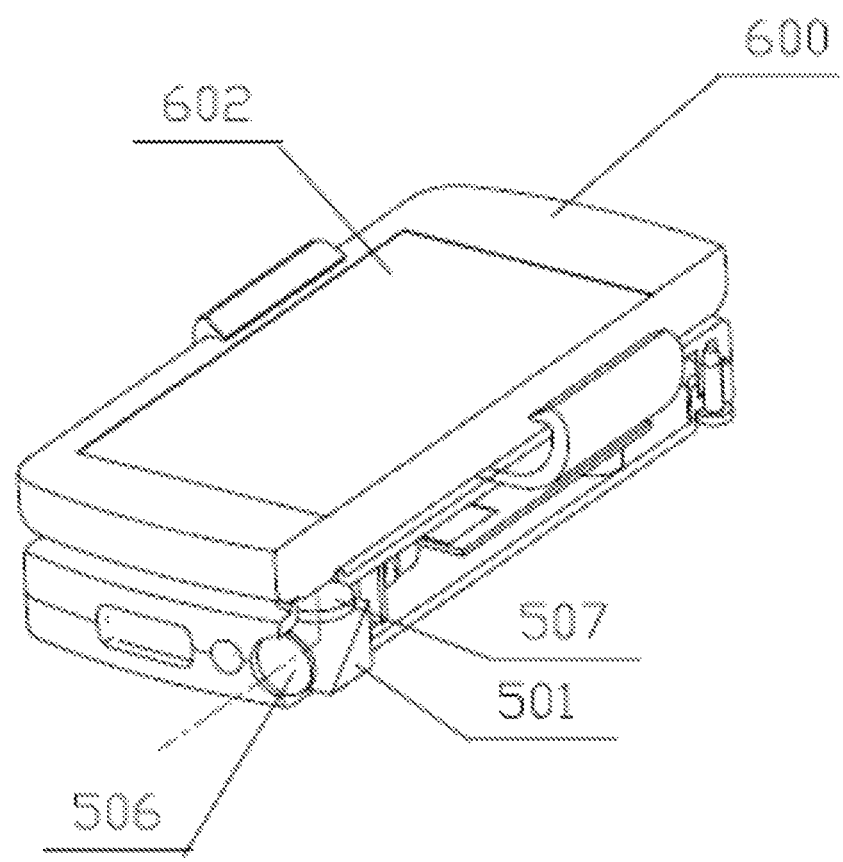
FIG. 7 is an internal schematic view of the laser range finder of FIG. 6 connected to a handheld terminal.
Figure 15:
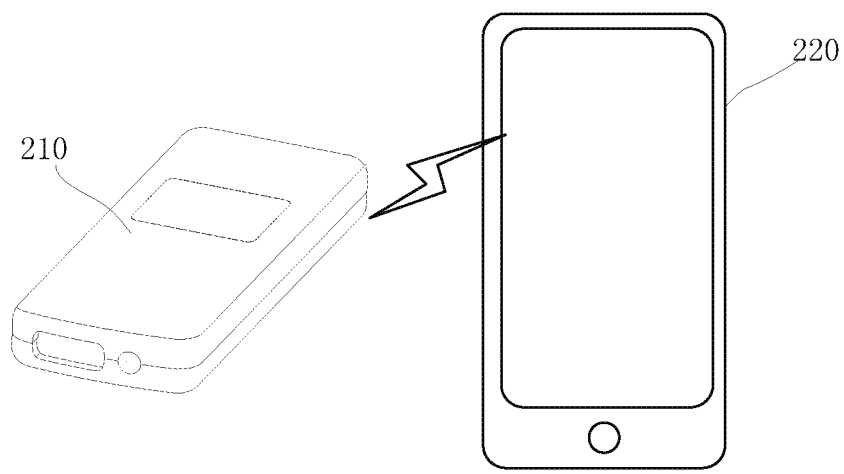
FIG. 15 is a schematic view of an engineering blueprint verifying system constructed according to the description which follows.
Figure 17:
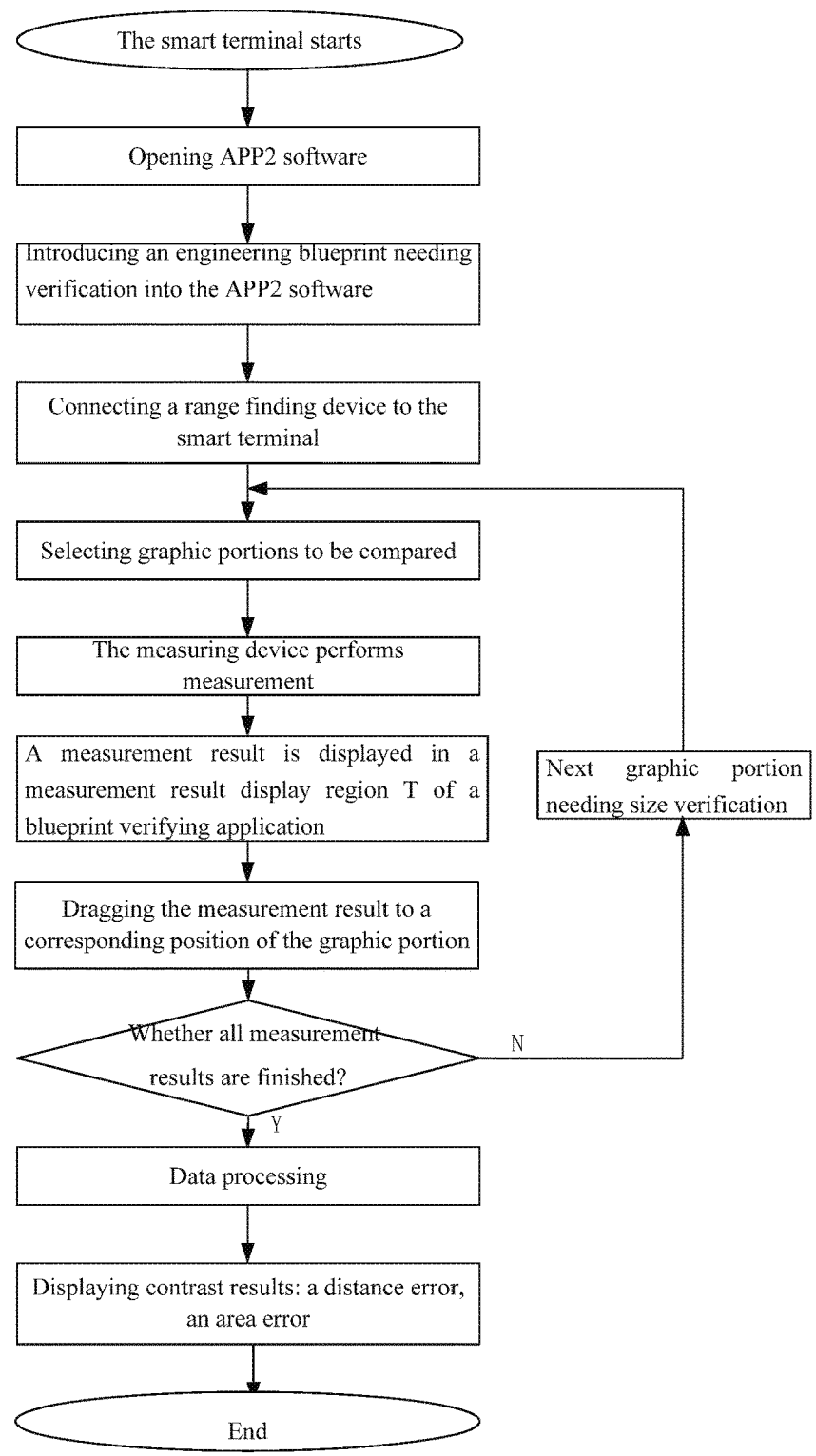
FIG. 17 is a flow chart of an exemplary method of operating the engineering blueprint verifying system of FIG. 15 to perform blueprint verification.
Figure 18:
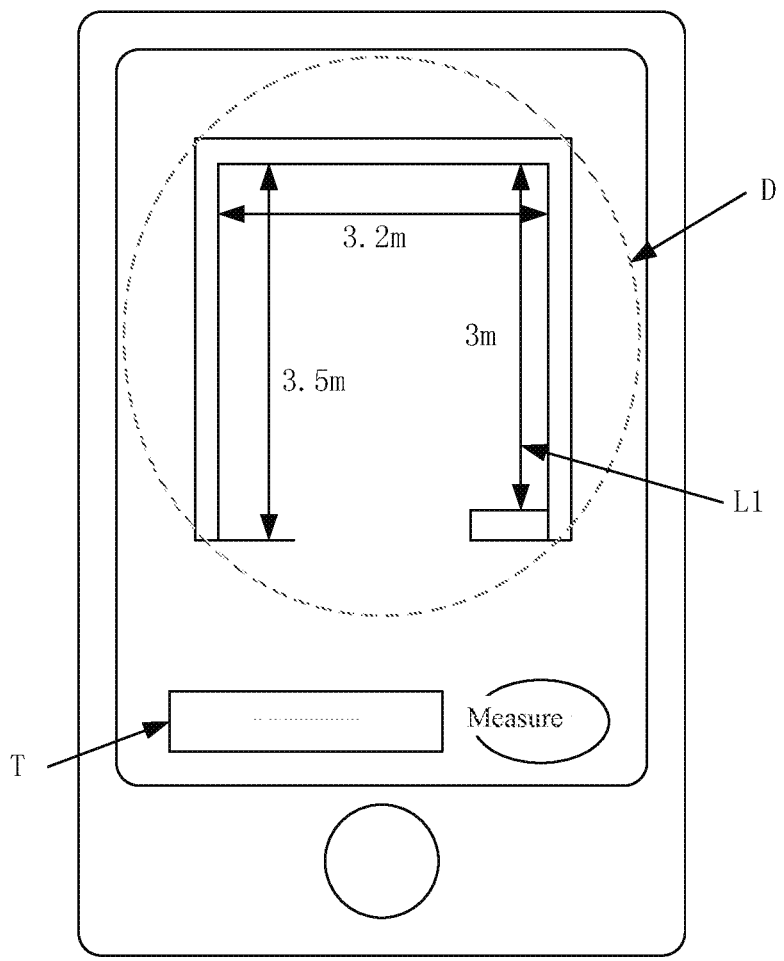
FIG. 18 is a schematic view of an exemplary interface of the blueprint verification application in the smart terminal of FIG. 15.
Figure 19:
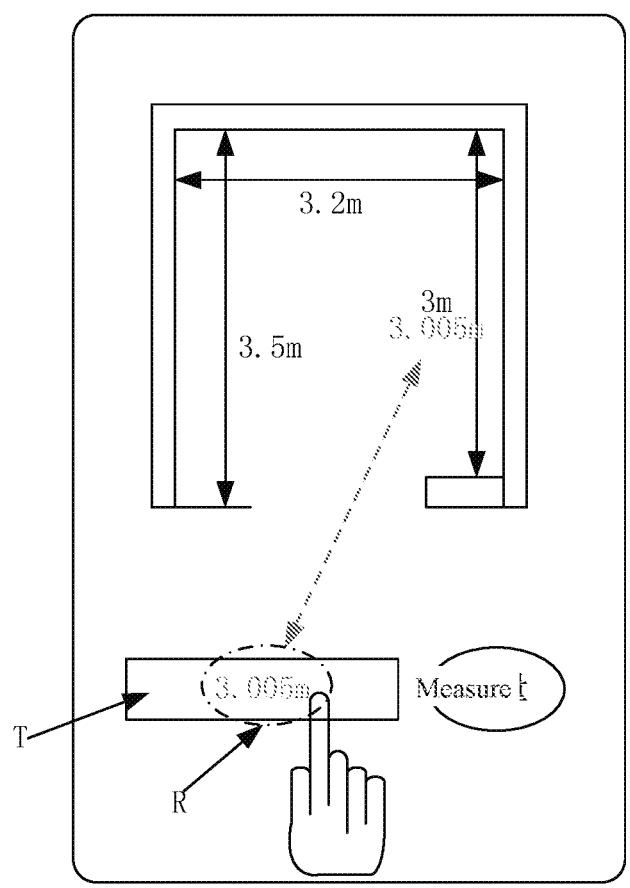
FIG. 19 is a schematic view of an exemplary data display interface of the blueprint verification application of FIG. 18.

FIG. 17 is a flow chart of a method of operating the engineering blueprint verifying system of FIG. 15 to perform blueprint verification. Referring to FIGS. 15-17, the method of verifying the engineering blueprint specifically includes the following steps:

a) first starting the smart terminal 220, wherein the memory of the smart terminal 220 stores the engineering blueprint;

b) starting the blueprint verifying application (APP2) in the smart terminal 220, and the operation interface of the blueprint verifying application is shown in FIG. 5;

c) introducing the engineering blueprint D to be verified into the blueprint verifying application;

c) connecting the smart terminal 220 to the measuring device 210, whereupon the measuring device 110 may be controlled via the blueprint verifying application;

d) selecting a graphic portion L1 needing size verification in the engineering blueprint;

e) controlling the measuring device 110 to perform range finding action via a "measure" button of the blueprint verifying application;

f) causing the measuring device 210 to send a measurement result R to the blueprint verifying application for display, for example, in a measurement result display region T of the blueprint verifying application, whereupon the user may drag the measurement result to a corresponding position of a graphic portion, as shown in FIG. 19. However, in other embodiments, the measurement result may be directly and simultaneously displayed in two regions; the first region is the measurement result display region T of the blueprint verifying application, and the other is a corresponding position of the graphic portion where data needs to be verified.

g) determining whether the graphic portion needing size verification has totally accomplished measurement;

h) performing subsequent data processing if yes, or continuing to measure the next graphic portion needing the size verification if no;

i) displaying a contrast result such as a length error and/or an area error.

In the illustrated system the measuring device 210 is a range finder. In other embodiments, the measuring device 210 may be a level measuring device, an angle measuring device or other measuring tools.

While the blueprint verifying application is described as controlling the measuring device 210 to perform range finding action via a "measure" button it is to be understood that the measuring device 210 may also perform automatic control without the Bluetooth verifying application, and the measuring device 210 may perform measurement by the user's manual control and then send the measurement result to blueprint verifying application. Furthermore, while the blueprint verifying application is described as performing automatic comparison for the original data and measurement result, in other embodiments, the blueprint verifying application need not perform automatic comparison, and the user may perform manual comparison for the original data and measurement result.

While the graphic portion needing size verification in the engineering blueprint is described as being selected by the user manually, it is to be understood that, after the engineering blueprint is introduced into the blueprint verifying application, the blueprint verifying application may automatically decompose the graphic portion needing size verification in the engineering blueprint, and sort in a predetermined order (counterclockwise or clockwise). As such, after the measuring device finishes one measurement, it will automatically select a graphic portion to be measured next, and the user needn't select manually.

To conclude, the engineering blueprint verifying system first connects the smart terminal to the measuring device, then sends, via the blueprint verifying application on the smart terminal, a control command to the measuring device to control the measuring device to execute the measuring action, and the measuring device sends the measurement result to the smart terminal so that contrast and calculation of data can be performed conveniently, and these measurement data can be stored in the memory of the smart terminal for subsequent processing, and thereby the applicability of the measurement result is improved.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A measuring system, comprising:
a measuring device including a laser module, an emitting lens, a receiving lens, an optical path bracket, a display module, a circuit board, a battery, and a body housing the optical path bracket, the display module, the circuit board, and the battery,
wherein the optical path bracket is used to carry the emitting lens, the receiving lens, and the laser module thereon, and the display module is arranged in a height range of the optical path bracket,
wherein the display module is located directly above the circuit board, and the optical path bracket is located at a position adjacent to the display module and not directly below the display module,
wherein the measuring device is a laser range finder, and the measuring module is a range finding module, and
wherein the laser range finder further comprises a reflection mirror which is disposed in the housing of the laser range finder, wherein the housing has a ray incident opening located on an incident ray side and a ray exit opening located on an exit ray side of the reflection mirror, and the ray incident opening and a receiving lens of the laser range finder are disposed on the same end face of the laser range finder, and the ray exit opening is adapted to the position of the camera device.

2. The measuring system according to claim 1, wherein an angle formed between the reflection mirror and an axis where the ray incident opening lies is between substantially 40 and 50 degrees.

3. The measuring system according to claim 1, wherein the receiving lens is a flat lens, and a ratio of a size of a long axis to a short axis of the receiving lens is between substantially 1.1:1 and 5:1.

4. The measuring system according to claim 1, wherein
the body of the measuring device defines opposite body lines substantially parallel to each other, and
wherein the receiving lens is disposed at a face of the body, and configured to have at least two lens edges substantially parallel to the body lines.

5. The measuring system according to claim 4, wherein the face of the body defines a long side and a short side, and a ratio of a size of a long axis to a short axis of the receiving lens is between substantially 1.1:1 and 5:1.

\* \* \* \* \*